Sept. 24, 1935.  R. VERMEULEN  2,015,169
CARBON MICROPHONE
Filed Jan. 25, 1930
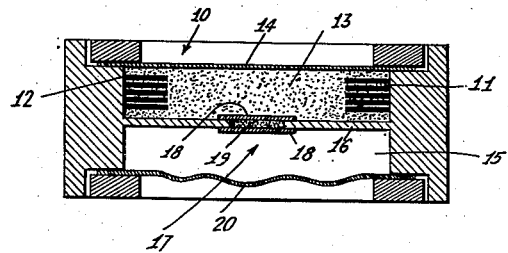
INVENTOR
ROELOF VERMEULEN
BY
ATTORNEY Patented Sept. 24, 1935

2,015,169

UNITED STATES PATENT OFFICE 2,015,169

CARBON MICROPHONE

Roelof Vermeulen, Eindhoven, Netherlands, assignor to Radio Corporation of America, a corporation of Delaware Application January 25, 1930, Serial No. 423,324
In the Netherlands March 2, 1929

3 Claims. (Cl. 179—122)

This invention relates to carbon-microphones. The usual type of carbon-microphone comprises a chamber in which two electrodes and carbon granules are enclosed, said chamber being closed by a diaphragm. This enclosure is endeavoured to be protected as far as possible from atmospheric influences, because the latter may be prejudicial to the carbon granules and may have the effect of materially lowering the quality of the microphone. This protection is ensured by a hermetic seal of the chamber with the result, however, that variations in pressure in the atmosphere induce a more or less intense strain on the diaphragm, which in its turn does not fail to affect the microphone.

The microphone according to this invention is not only furnished with the chamber which contains the electrodes and the carbon granules and which is shut off from the open air by a diaphragm but is in addition provided with a second chamber which communicates with the first and which is also shut off from the open air by a flexible slack diaphragm. The expression "flexible slack diaphragm" is to be understood to mean hereinafter a diaphragm which as compared with the diaphragm of the first-mentioned chamber yields more readily under the action of atmospheric variations in pressure and thus balances any difference between the pressures prevailing inside and outside the chamber. The advantage of the microphone according to the invention consists in that the carbon granules are constantly protected from atmospheric influences and that also the diaphragm of the first chamber will always respond in the same manner to variations in pressure brought about by acoustic vibrations.

According to one embodiment of the invention the second chamber contains air of atmospheric pressure. However, if desired, this chamber may be filled with an inert gas. The diaphragm by which this chamber is shut off may be of rubber or of other suitable material which may be slackly stretched.

The two chambers communicate through an aperture covered with gauze. Preferably the aperture is filled with glasswool limited on each side by gauze. Thus the carbon granules are prevented from flowing from the first to the second chamber and at the same time a free communication of air between the two chambers is ensured.

The invention will be more clearly understood by reference to the accompanying drawing, illustrating by way of example, one embodiment of the invention.

In the said drawing, 10 designates a chamber containing electrodes 11 and 12 and carbon granules 13. This chamber is closed by a mica diaphragm 14. The chamber 10 is separated from the chamber 15 by means of a wall 16 in which an aperture 17 is formed. This opening is covered on either side with gauze 18, glasswool 19 being enclosed between the gauze. The chamber 15 is shut off from the open air by a slack diaphragm 20 of rubber.

The chamber 10 as well as the chamber 15 are protected respectively by the diaphragms 14 and 20 from atmospheric influences so that the carbon granules 13 cannot be affected, for example, by moisture. If the atmospheric pressure changes a pressure will be exercised both on the diaphragm 14 and on the diaphragm 20. Since, however, the latter yields more readily than the former, a balance will be established between the pressures prevailing inside and outside the chambers 10 and 15 owing to the yielding effect of the diaphragm 20 so that the tension in the diaphragm 14 is not altered.

What is claimed is,

1. A carbon microphone comprising a pair of chambers separated by a wall, an aperture in said wall for providing communication between said chambers, a piece of flexible material covering said aperture, carbon granules and electrodes in one of said chambers, a diaphragm on the opposite side of the chamber from said aperture for transmitting sound wave pressure variations to said carbon granules, and means for permitting atmospheric pressure to vary the pressure in the other chamber.

2. A carbon microphone comprising means forming a pair of chambers, a passageway between said chambers, glass wool in said passageway, a layer of gauze on each side of said glass wool, carbon granules and electrodes in one of said chambers, a diaphragm for transmitting sound wave pressure variations to said carbon granules and means for permitting atmospheric pressure to vary the pressure in the other chamber.

3. An acoustic device comprising means forming a pair of chambers, a diaphragm responsive to sound wave pressure variations and atmospheric pressure variations, said diaphragm being adjacent one of said chambers so that the pressure in the chamber is varied by the response of the diaphragm to said pressure variations, means responsive solely to atmospheric pressure variations, said means being adjacent the other of said chambers and separated from said diaphragm by said chambers so that the pressure in said other chamber is varied by the response of said means to said pressure variations, a fluid medium in the last mentioned chamber, carbon granules in the first mentioned chamber, electrodes in contact with said carbon granules, and means associated with both of said chambers for equalizing the pressure in said chambers and for restricting the contents of at least one of said chambers to its chamber.

ROELOF VERMEULEN.